(12) United States Patent
Grimm et al.

(10) Patent No.: US 11,946,613 B2
(45) Date of Patent: Apr. 2, 2024

(54) TRANSLUCENT METALLISED DESIGN SURFACE

(71) Applicant: Covestro Intellectual Property GmbH & Co. KG, Leverkusen (DE)

(72) Inventors: Thomas Grimm, Cologne (DE); Rainer Hagen, Leverkusen (DE); Ulrich Grosser, Kürten (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 124 days.

(21) Appl. No.: 17/642,363

(22) PCT Filed: Sep. 21, 2020

(86) PCT No.: PCT/EP2020/076241
§ 371 (c)(1),
(2) Date: Mar. 11, 2022

(87) PCT Pub. No.: WO2021/058420
PCT Pub. Date: Apr. 1, 2021

(65) Prior Publication Data
US 2022/0333759 A1      Oct. 20, 2022

(30) Foreign Application Priority Data
Sep. 26, 2019   (EP) .................................... 19199732

(51) Int. Cl.
*F21S 43/20* (2018.01)
*B32B 27/08* (2006.01)
*F21V 3/06* (2018.01)

(52) U.S. Cl.
CPC .............. *F21S 43/26* (2018.01); *B32B 27/08* (2013.01); *F21V 3/062* (2018.02); *B32B 2307/412* (2013.01)

(58) Field of Classification Search
CPC .......... F21S 43/26; F21V 3/062; B32B 27/08; B32B 2307/412
See application file for complete search history.

(56) References Cited

U.S. PATENT DOCUMENTS

| | | | |
|---|---|---|---|
| 2,991,273 | A | 7/1961 | Hechelhammer et al. |
| 2,999,835 | A | 9/1961 | Goldberg |
| (Continued) | | | |

FOREIGN PATENT DOCUMENTS

| | | | |
|---|---|---|---|
| DE | 2063050 | A | 7/1972 |
| DE | 3832396 | A | 2/1990 |
| (Continued) | | | |

OTHER PUBLICATIONS

H. Schnell, Chemistry and Physics of Polycarbonates, Interscience Publishers, New York 1964, p. 28 ff. and p. 102 ff.
(Continued)

*Primary Examiner* — Thomas M Sember
(74) *Attorney, Agent, or Firm* — John E. Mrozinski, Jr.

(57) ABSTRACT

The invention relates to a multi-layered body comprising a transparent thermoplastic layer, a diffuser layer and a metal layer which, despite a decorative, structured visible surface, can transport information from a projection unit behind it with excellent sharpness and brightness. Corresponding elements can be used, for example, in Car-to-X communication.

15 Claims, 1 Drawing Sheet

(56) References Cited

U.S. PATENT DOCUMENTS

| | | | |
|---|---|---|---|
| 2,999,846 | A | 9/1961 | Schnell et al. |
| 3,148,172 | A | 9/1964 | Fox |
| 3,271,367 | A | 9/1966 | Schnell et al. |
| 4,982,014 | A | 1/1991 | Freitag et al. |
| 7,351,474 | B2 | 4/2008 | Etzrodt et al. |
| 8,562,196 | B2 | 10/2013 | Lust et al. |
| 8,641,784 | B2 | 2/2014 | Meyer et al. |
| 2007/0026197 | A1* | 2/2007 | Suga ............ B32B 27/06 264/510 |
| 2008/0063836 | A1 | 3/2008 | Lochner |
| 2009/0093589 | A1 | 4/2009 | Bruchmann et al. |
| 2010/0104774 | A1* | 4/2010 | Husemann ........ G02F 1/133603 428/354 |
| 2019/0210336 | A1* | 7/2019 | Schibull ............ B32B 7/12 |

FOREIGN PATENT DOCUMENTS

| | | |
|---|---|---|
| DE | 10337456 A1 | 6/2004 |
| DE | 102010008334 A1 | 8/2011 |
| EP | 1932726 A2 | 6/2008 |
| GB | 1122003 A | 7/1968 |
| GB | 1229482 A | 4/1971 |
| GB | 1367788 A | 9/1974 |
| GB | 1367790 A | 9/1974 |
| WO | 2018154762 A1 | 8/2018 |

OTHER PUBLICATIONS

D. Freitag, U. Grigo, p. R. Müller, H. Nouvertné, Bayer AG, "Polycarbonates" in Encyclopedia of Polymer Science and Engineering, vol. 11, Second Edition, 1988, pp. 648-718.

U. Grigo, K. Kirchner and P. R. Müller "Polycarbonate [Polycarbonates]" in Becker/Braun, Kunststoff-Handbuch [Plastics Handbook], vol. 3/1, Polycarbonate, Polyacetale, Polyester, Celluloseester [Polycarbonates, polyacetals, polyesters, cellulose esters], Carl Hanser Verlag Munich, Vienna 1992, pp. 117-299.

D.G. Legrand, J.T. Bendler, Handbook of Polycarbonate Science and Technology, Marcel Dekker New York 2000, p. 72 ff.

International Search Report, PCT/EP2020/076241, dated Nov. 20, 2020.

* cited by examiner

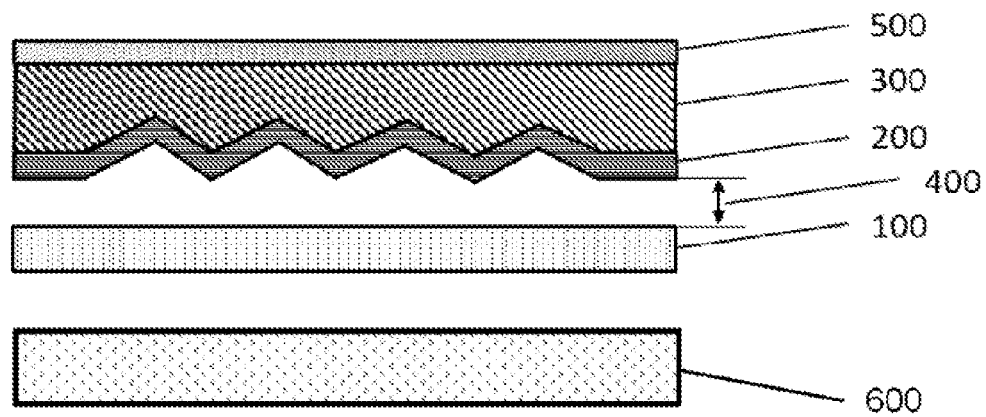

TRANSLUCENT METALLISED DESIGN SURFACE

CROSS REFERENCE TO RELATED APPLICATIONS

This application is a national stage application under 35 U.S.C. § 371 of PCT/EP2020/076241, filed Sep. 21, 2020, which claims benefit of European Application No. 19199732.9, filed Sep. 26, 2019, both of which are incorporated herein by reference in their entireties.

FIELD OF THE INVENTION

The invention relates to a combination of a decorative multilayer body and a light source which conveys information. The invention also relates to the use of such an element.

BACKGROUND OF THE INVENTION

Bodywork components based on thermoplastic material for use in vehicles offer substantial advantages over bodywork components made from other materials, such as glass or metal, for example. These include, for example, elevated impact strength, high fracture resistance and/or a weight saving, which in the case of automobiles allow greater occupant safety in road traffic accidents and lower fuel consumption. Lastly, thermoplastic materials allow substantially greater design freedom for bodywork attachment parts on account of their easier moldability. The latter is becoming increasingly important as a result of the most recent developments in the field of part- and full-electric drives, since motor vehicles can be designed more aerodynamically and their design can be more significantly distinguished from conventional internal combustion vehicles. A well-known example of a new, aerodynamic design is the front grille consisting of a thermoplastic molding which is closed over its surface area. In addition, transparent, transparently colored and translucent thermoplastic polymers are suitable for equipping attachment parts such as headlights or front grilles with light functions. Prompted by developments for personalization of vehicles and for highly automated and autonomous driving, there is a demand for more and new variants of indicator lights and decorative lights which elevate communication of the vehicle with its surroundings ("car-to-X") to a higher level.

In this respect, it is a technical object to integrate display functions, light functions and light designs into aerodynamically closed, decorative thermoplastic moldings.

The prior art has already described a closed front grille of a vehicle with an integrated electronic display. The solution described in DE 102010008334 A1 has the advantage that the electronic display is located behind a closed cover sheet and can in this case perform both decorative and informative tasks. The display described has a primary light source with a light guide plate, which both illuminates the display panel and provides light for highlighting a brand logo positioned centrally in the grille. Light color and light intensity for the decorative light can be controlled electronically. Technical solutions of this kind have the major drawback that the bodywork surface reserved by the display is no longer available for real, i.e. non-digitally displayed, decorative elements. This is because an electronic display can only inadequately simulate the dynamic appearance of a decoration that is generated by natural ambient light. The difference between the naturally changing play of light, shadow and color of a decoration and electronically generated images is always noticeable and can be perceived as disturbing, especially when the electronically generated image is intended to simulate three-dimensionality or metallically reflective surfaces. A further disadvantage is that electronic displays always consume electrical energy. Continuous operation of a display solely for the purpose of performing a decorative task is therefore unfavorable in terms of energy.

No procedure can be derived from the prior art as to how such a component should be provided. DE 10337456 A1 describes vapor deposition and sputtering methods for producing metal coatings. DE 102005006459 A1 discloses a metallized plastics component produced using such a method and having a display element which has a first adhesion-promoting layer provided with a metal coating. The metal coating, which is opaque per se, is partially removed with a laser to enable backlighting. However, such a system does not go beyond an illuminated decorative element. In the event of two-dimensional rear projection, the remaining opaque portions of the metal coating would appear as dark defects in the information display. The display of variable information without image distortion is therefore not possible.

WO 2008/034610 A1 shows that sufficiently thin vapor-deposited or sputtered metal layers are partly transmissive for LED light, meaning that, combined with an opaque paint layer lying behind the metal layer, symbols can be illuminated when the backlighting is activated and the symbols are not visible as a result of the metallic gloss when the backlighting is deactivated. Multi-component injection molding methods or in-mold coating of an opaque film in a combined work step are mentioned as methods for producing the display element. However, this component can only be used as an LED symbol display with "on/off" circuitry, not as a changing display with variable image content and variable colors.

BRIEF DESCRIPTION OF THE FIGURES

The present invention will now be described for purposes of illustration and not limitation in conjunction with the figures, wherein:

FIG. 1 shows a lighting unit according to the invention.

DETAILED DESCRIPTION OF THE INVENTION

The present invention has the object of providing a sheetlike thermoplastic molding having a decorative structure, said molding being suitable for use as a decorative bodywork component of a vehicle and simultaneously as a—preferably colored—changing display. In particular, as much area as possible, i.e. over the topographically designed decorative elements, is to be usable as a markedly contoured display screen. Account should in this case be taken of the safety aspect of an automobile exterior display, the image and video information of which should be recognizable over a wide field of view in a contrast-rich and error-free manner.

Surprisingly, it has been found that by way of a lighting unit as claimed in claim 1, despite the decorative surface with structure, precisely contoured information can be conveyed via the light and the object described above is achieved.

In the context of the invention, a lighting unit comprises the following elements in this sequence:

a transparent thermoplastic layer having a visible side and a side facing away from the visible side, wherein
the transparent layer has a transmittance Ty of ≥10%, determined in accordance with DIN ISO 13468-2:2006 (D65, 10°), and
has a 3-dimensionally structured surface on the side facing away from the visible side,
a metal layer directly on the transparent layer on the side facing away from the visible side, wherein the metal layer has a transmittance Ty of ≥4%, determined in accordance with DIN ISO 13468-2:2006 (D65, 10°),
wherein the combined transmittance Ty of the metal layer with the transparent layer, determined in accordance with DIN ISO 13468-2:2006 (D65, 10°), is at least 3.0%,
a diffuser layer, which is at a distance of ≤5 mm from the metal layer and has a transmittance Ty of at least >50%, determined in accordance with DIN ISO 13468-2:2006 (D65, 10°), and a half-value angle of 0°<x<70°, determined in accordance with DIN 5036:1978 (based on the light intensity),
a light source, which conveys information and is at a distance from the diffuser layer of <80 cm, preferably <50, particularly preferably <15 cm, very particularly preferably <5 cm.

The individual elements of a lighting unit according to the invention are described in more detail below.

The lighting unit comprises a transparent layer having a visible side and a side opposite the visible side. Transparent in the context of the present invention means that the layer has a light transmittance Ty of ≥10%, preferably ≥50%, more preferably ≥65%, even more preferably of ≥65%, particularly preferably up to 75%, determined in accordance with DIN ISO 13468-2:2006 (D65, 10°). The transmittance relates to the respective layer in its respective thickness. If, for example, the layer has a thickness of 2 mm, the value for the transmittance should be read on a 2 mm-thick layer. According to the invention, the haze of the transparent layer is preferably less than 5%, more preferably less than 3%, and particularly preferably less than 2.0%, determined in accordance with ASTM D1003:2013. The transparent layer is preferably smooth on the visible side of the lighting unit, that is to say the side facing away from the artificial light source. In the context of the invention, "smooth" means the presence of a high gloss surface. The maximum roughness of such a surface, Ra, is preferably <0.1 μm, particularly preferably <0.05 μm, very particularly preferably below 0.025 μm, determined in accordance with DIN EN ISO 1302:2002-06. The side of the transparent layer opposite the visible side is 3-dimensionally structured.

The transparent layer consists of a thermoplastic material. The thermoplastic material is preferably based on one of the following polymers:
aromatic polycarbonate (PC), including copolycarbonate, polyester carbonate, polystyrene (PS), styrene copolymers such as for example transparent polystyrene-acrylonitrile (PSAN), polyalkylenes such as polyethylene (PE) and polypropylene (PP), aromatic polyester such as polyethylene terephthalate (PET) and polybutylene terephthalate (PBT), PET-cyclohexanedimethanol copolymer (PETG), polyethylene naphthalate (PEN), polyacrylate, copolyacrylate, especially poly- or copolymethyl methacrylates such as polymethyl methacrylate (PMMA), polyimides (e.g. PMMI), polyethersulfones, thermoplastic polyurethanes, cyclic olefin polymers or copolymers (COP or COC) or mixtures of the components mentioned, provided that these mixtures are transparent, preferably based on aromatic polycarbonate and/or polymethyl methacrylate, particularly preferably based on aromatic polycarbonate.

In the context of the present invention the term polycarbonates comprises both homopolycarbonates and copolycarbonates. The polycarbonates may be linear or branched in known fashion. Where reference is made to "polycarbonates" in the context of the present invention, this is always understood as meaning aromatic polycarbonates, even if not explicitly mentioned.

The polycarbonates are produced in a known manner from dihydroxyaryl compounds, carbonic acid derivatives, and optionally chain terminators and branching agents.

Details of the production of polycarbonates have been set out in many patent specifications during the last 40 years or so. Reference may be made here for example to Schnell, "Chemistry and Physics of Polycarbonates", Polymer Reviews, Volume 9, Interscience Publishers, New York, London, Sydney 1964, and to D. Freitag, U. Grigo, P. R. Müller, H. Nouvertné, BAYER AG, "Polycarbonates" in Encyclopedia of Polymer Science and Engineering, Volume 11, Second Edition, 1988, pages 648-718, and finally to Drs. U. Grigo, K. Kirchner and P. R. Midler "Polycarbonate [Polycarbonates]" in Becker/Braun, Kunststoff-Handbuch [Plastics Handbook], Volume 3/1, Polycarbonate, Polyacetale, Polyester, Celluloseester [Polycarbonates, polyacetals, polyesters, cellulose esters], Carl Hanser Verlag Munich, Vienna 1992, pages 117-299.

Dihydroxyaryl compounds suitable for the production of polycarbonates are for example hydroquinone, resorcinol, dihydroxydiphenyls, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, alpha-alpha'-bis(hydroxyphenyl)diisopropylbenzenes, phthalimidines derived from derivatives of isatin or phenolphthalein and the ring-alkylated, ring-arylated and ring-halogenated compounds thereof.

Preferred dihydroxyaryl compounds are 4,4'-dihydroxydiphenyl, 2,2-bis(4-hydroxyphenyl)propane, 2,4-bis(4-hydroxyphenyl)-2-methylbutane, 1,1-bis(4-hydroxyphenyl) phenylethane, 1,3-bis[2-(4-hydroxyphenyl)-2-propyl] benzene (bisphenol M), 1,1-bis(4-hydroxyphenyl)-p-diisopropylbenzene, 2,2-bis(3-methyl-4-hydroxyphenyl) propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,1-bis(3,5-dimethyl-4-hydroxyphenyl)-p-diisopropylbenzene, 2,2-bis(3,5-dichloro-4-hydroxyphenyl)propane, 2,2-bis(3,5-dibromo-4-hydroxyphenyl)propane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC) and the bisphenols of formulae (I) to (III)

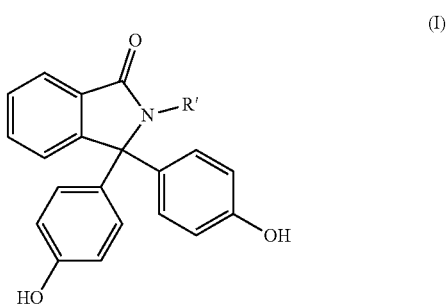

(I)

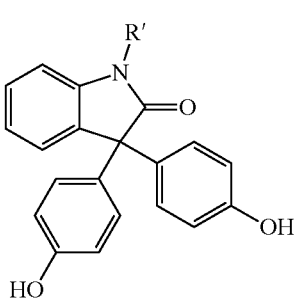

(II)

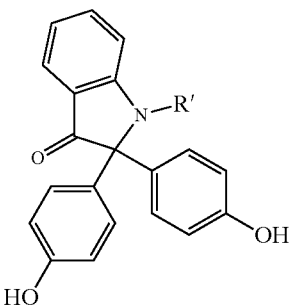

(III)

in which R' in each case represents a $C_1$- to $C_4$-alkyl radical, aralkyl radical or aryl radical, preferably a methyl radical or phenyl radical, most preferably a methyl radical.

Particularly preferred dihydroxyaryl compounds are 4,4'-dihydroxydiphenyl, 1,1-bis(4-hydroxyphenyl)phenylethane, 2,2-bis(4-hydroxyphenyl)propane, 2,2-bis(3,5-dibromo-4-hydroxyphenyl)propane, 2,2-bis(3,5-dichloro-4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC), and also the dihydroxyaryl compounds of formulae (I), (II) and/or (III).

These and other suitable dihydroxyaryl compounds are described for example in U.S. Pat. Nos. 2,999,835 A, 3,148,172 A, 2,991,273 A, 3,271,367 A, 4,982,014 A and 2,999,846 A, in German laid-open specifications 1 570 703 A, 2 063 050 A, 2 036 052 A, 2 211 956 A and 3 832 396 A, in the French patent specification 1 561 518 A1, in the monograph "H. Schnell, Chemistry and Physics of Polycarbonates, Interscience Publishers, New York 1964, p. 28 ff. and p. 102 ff.", and in "D. G. Legrand, J. T. Bendler, Handbook of Polycarbonate Science and Technology, Marcel Dekker New York 2000, p. 72 ff.".

In the case of homopolycarbonates only one dihydroxyaryl compound is used; in the case of copolycarbonates two or more dihydroxyaryl compounds are used.

Examples of suitable carbonic acid derivatives are phosgene or diphenyl carbonate.

Suitable chain terminators employable in the production of the polycarbonates include both monophenols and monocarboxylic acids. Suitable monophenols are for example phenol itself, alkylphenols such as cresols, p-tert-butylphenol, cumylphenol, p-n-octylphenol, p-isooctylphenol, p-n-nonylphenol and p-isononylphenol, halophenols such as p-chlorophenol, 2,4-dichlorophenol, p-bromophenol and 2,4,6-tribromophenol, 2,4,6-triiodophenol, p-iodophenol and mixtures thereof.

Preferred chain terminators are moreover phenols which are mono- or polysubstituted with linear or branched, preferably unsubstituted $C_1$ to $C_{30}$ alkyl radicals or with tert-butyl. Particularly preferred chain terminators are phenol, cumylphenol and/or p-tert-butylphenol.

Suitable monocarboxylic acids are moreover benzoic acid, alkylbenzoic acids and halobenzoic acids.

The amount of chain terminator to be used is preferably 0.1 to 5 mol %, based on moles of dihydroxyaryl compounds used in each case. The addition of the chain terminators may be carried out before, during or after the reaction with a carbonic acid derivative.

Suitable branching agents are the trifunctional or more than trifunctional compounds known in polycarbonate chemistry, in particular those having three or more than three phenolic OH groups.

Suitable branching agents are for example phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, hexa-(4-(4-hydroxyphenylisopropyl)phenyl) orthoterephthalate, tetra(4-hydroxyphenyl)methane, tetra(4-(4-hydroxyphenylisopropyl)phenoxy)methane and 1,4-bis((4', 4''-dihydroxytriphenyl)methyl)benzene and 2,4-dihydroxybenzoic acid, trimesic acid, cyanuric chloride and 3,3-bis(3-methyl-4-hydroxyphenyl)-2-oxo-2,3-dihydroindole.

The amount of any branching agents to be used is preferably 0.05 mol % to 2.00 mol %, based again on moles of dihydroxyaryl compounds used in each case.

The branching agents can either form an initial charge with the dihydroxyaryl compounds and the chain terminators in the aqueous alkaline phase or can be added, dissolved in an organic solvent, before the phosgenation. In the case of the transesterification method, the branching agents are used together with the dihydroxyaryl compounds. The aromatic polycarbonates present in the compositions according to the invention are preferably produced by the interfacial method.

Preference is given to using linear polycarbonates.

The aromatic polycarbonates of the present invention preferably have weight-average molecular weights $M_w$ of between 10 000 and 50 000 g/mol, more preferably of between 14 000 and 40 000 g/mol, even more preferably of between 15 000 and 35 000 g/mol, particularly preferably of between 18 000-32 000 g/mol, very particularly preferably of between 20 000 and 28 000 g/mol. The values apply to determination by gel permeation chromatography using dichloromethane as eluent, calibration with linear polycarbonates (composed of bisphenol A and phosgene) of known molar mass distribution from PSS Polymer Standards Service GmbH, Germany; calibration according to method 2301-0257502-09D (2009 German Edition) from Currenta GmbH & Co. OHG, Leverkusen. The eluent for the calibration is likewise dichloromethane. Column combination of crosslinked styrene-divinylbenzene resins. Diameter of analytical columns: 7.5 mm; length: 300 mm Particle sizes of column material: 3 µm to 20 µm. Concentration of solutions: 0.2% by weight. Flow rate: 1.0 ml/min, temperature of solutions: 30° C. Detection using a refractive index (RI) detector.

The MVR value of the aromatic polycarbonate, measured in accordance with ISO 1133:2012-03 at 300° C. and 1.2 kg, is preferably 5 to 35 cm³/(10 min), more preferably 10 to 20 cm³/(10 min).

The reported $M_W$ and MVR values are based on the aromatic polycarbonates present in the composition in their entirety.

Particularly preferred polycarbonates are the homopolycarbonate based on bisphenol A, the homopolycarbonate based on 1,3-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

"Based on" means that preferably at least 60% by weight, more preferably at least 70% by weight, even more preferably at least 80% by weight, of the total composition of the thermoplastic material is the corresponding polymer. In addition to one or more of the polymers mentioned, the thermoplastic material preferably comprises further customary additives. Examples of these include flame retardants, antistats, UV absorbers, stabilizers, antioxidants and demolding agents. Suitable ultraviolet absorbers are benzotriazoles, triazines, benzophenones and/or arylated cyanoacrylates. Preferred stabilizers include phosphites and phosphonites and also phosphines. It is also possible to employ alkyl phosphates, for example mono-, di- and trihexyl phosphate, triisooctyl phosphate and trinonyl phosphate. Employable antioxidants include phenolic antioxidants such as alkylated monophenols, alkylated thioalkylphenols, hydroquinones and alkylated hydroquinones. Suitable demolding agents are for example those based on a fatty acid ester, preferably based on a stearic ester, especially preferably based on pentaerythritol. Preference is given to using pentaerythritol tetrastearate (PETS) and/or glycerol monostearate (GMS).

The composition particularly preferably contains less than 0.1% by weight of, and the composition is very particularly preferably free from, scattering additives, for example those based on acrylate, polyethylene, polypropylene, polystyrene, glass, aluminum oxide and/or silicon dioxide. Furthermore the composition particularly preferably contains less than 0.1% by weight of, and very particularly preferably is free from, white pigments or similar pigments such as, for example, titanium dioxide, kaolin, barium sulfate, zinc sulfide, aluminum oxide, aluminum hydroxide, quartz flour, from interference pigments and/or pearlescent pigments, i.e. platelet-shaped particles such as mica, graphite, talc, SiO2, chalk and/or titanium dioxide, coated and/or uncoated.

Furthermore, the composition particularly preferably contains less than 0.1% by weight of, and the composition is very particularly preferably free from, nanoparticulate systems such as metal particles, metal oxide particles. The composition preferably also contains less than 0.1% by weight of, and particularly preferably is free from, pigments based on insoluble pigments, such as are described for example in DE 10057165 A1 and in WO 2007/135032 A2.

Colorants can be added to the transparent material in order to change the color impression. The thermoplastic material is preferably transparently colored, and particularly preferably is transparently neutral-gray colored. This has the advantage of retaining the color space of the light source which is situated behind the transparent layer, conveys information and which for example can be a display. Such neutral-gray colored compositions are for example described in EP 2 652 029 A2, which describes a preferred material for the transparent thermoplastic layer. Corresponding polycarbonate compositions contain a colorant or a colorant combination of the structures selected from:

(1a) and/or (1b) and (4) and (2a) and/or (2b),
II. (1a) and/or (1b) and (5) and (2a) and/or (2b),
III. (1a) and/or (1b) and (7),
IV. (1a) and/or (1b) and (4) and (7),
V. (1a) and/or (1b) and (5) and (7),
VI. (4) and (2a) and/or (2b),
VII. (5) and (2a) and/or (2b),
VIII. (2a) and/or (2b) and (4) and (6),
IX. (2a) and/or (2b) and (5) and (6),
X. (3) and (4),
XI. (3) and (5),
XII. (3) and (4) and (6),
XIII. (3) and (5) and (6),
XIV. (3) and (4) and (7),
XV. (3) and (5) and (7),
XVI. (3) and (4) and (2a) and/or (2b),
XVII. (3) and (5) and (2a) and/or (2b),
XVIII. (6) and (1a) and/or (1b),
XIX. (6) and (1a) and/or (1b) and (7),
XX. (1a) and/or (1b) and (8),
XXI. (7) and (4),
XXII. (7) and (5),
XXIII. (1a) and/or (1b),
XXIV. (2a) and/or (2b),
XXV. (7),
XXVI. (2a) and/or (2b) and (7),
where the structures are as follows:

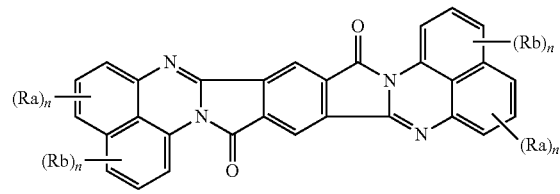

(1a)

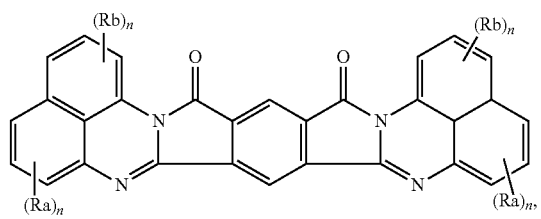

(1b)

where
Ra and Rb are independently a linear or branched alkyl radical or halogen;
n independently of the respective R is a natural number between 0 and 3, and the radical is hydrogen when n=0;

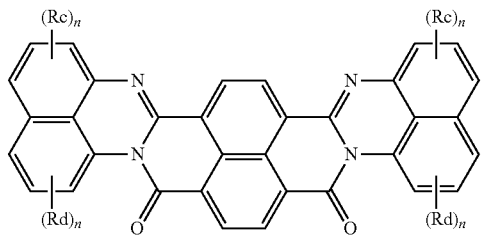

(2a)

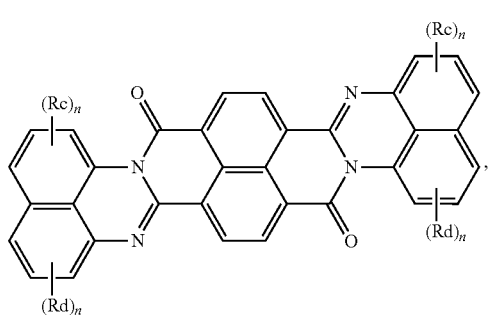
(2b)

where
Rc and Rd are independently a linear or branched alkyl radical or halogen;
n independently of the respective R is a natural number between 0 and 3, and the radical is hydrogen when n=0;

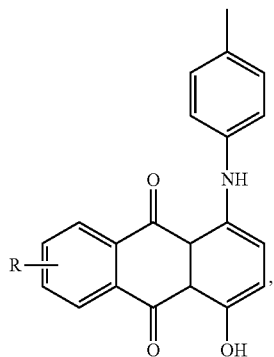
(3)

where
R is selected from the group consisting of H and p-methylphenylamine radical;

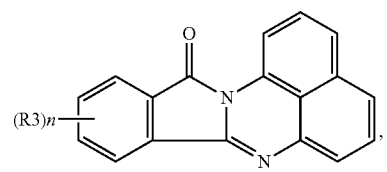
(4)

where
R3 is halogen;
n=4;

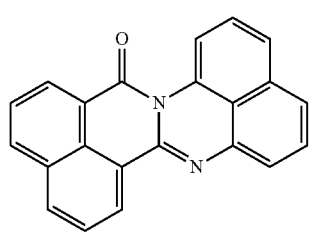
(5)

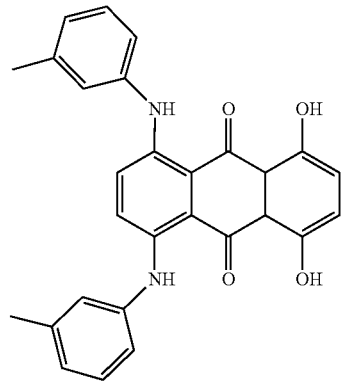
(6)

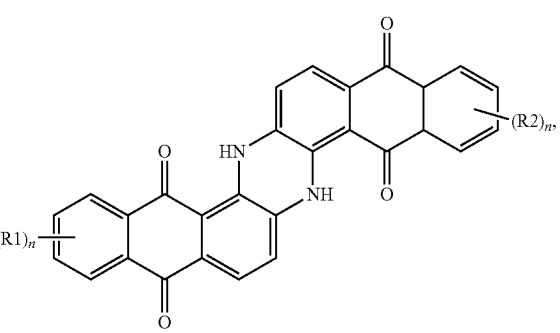
(7)

where
R1 and R2 are independently a linear or branched alkyl radical or halogen;

n is a natural number between 0 and 4;

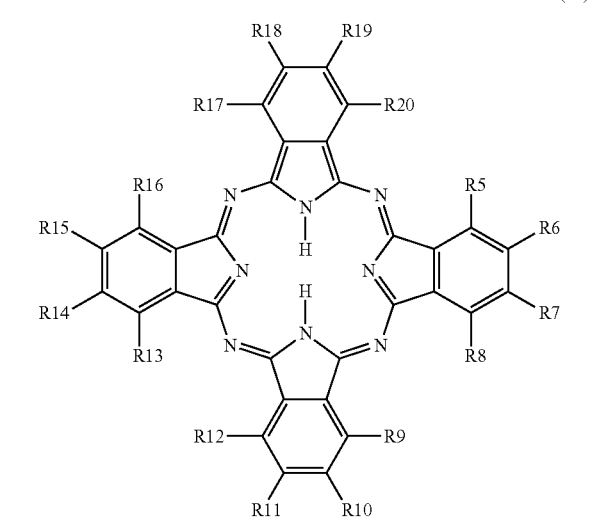
(8a)

(8b)

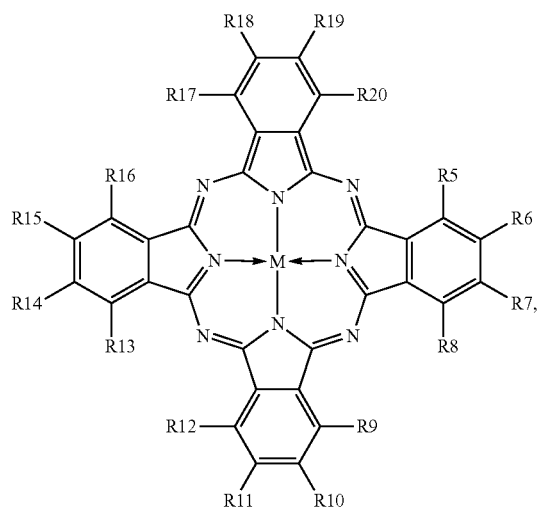

where
the radicals R(5-20) are in each case independently of one another hydrogen, methyl, ethyl, propyl, isopropyl, butyl, isobutyl, tert-butyl, pentyl, neopentyl, hexyl, thexyl, fluorine, chlorine, bromine, sulfone or CN and
M is selected from the group consisting of aluminum, nickel, cobalt, iron, zinc, copper and manganese,
where the colorants of structures (1a), (1b), (2a), (2b), (3) and the colorants of structures (4), (5), (6), (7), (8a/b) are used in the thermoplastic polymer composition, based on the respective individual component, in amounts of 0.000001% by weight to 1.000000% by weight, based on the total polymer composition.

The transparent layer is preferably produced by means of an injection molding process. Thermoforming is also conceivable in principle.

The thickness of the transparent layer is preferably in the range between 2 and 8 mm, particularly preferably between 2.5 and 6 mm, very particularly preferably between 3 and 4 mm The transparent thermoplastic layer has a 3-dimensionally structured surface. The term "3-dimensionally structured surface" encompasses patterns, textures and grains which comprise a, specifically introduced into the surface, spatial arrangement and distribution of individual structural elements from which a visual impression of an optical design arises for a viewer. To this end, structural elements are present with a lateral extent having dimensions of preferably at least 1 mm, more preferably greater than 3 mm, particularly preferably greater than 5 mm. In addition, the surface normals of these structural elements preferably have an angular deviation of >0.5°, preferably of >2.5°, particularly preferably of >10°, based on the surface normals of the adjoining structural elements. Furthermore, the height of the 3-dimensional structural elements is preferably in the range from 0.1 to 4 mm, preferably in the range from 0.2 to 1.5 mm, particularly preferably in the range from 0.5 to 1 mm. "From"/"to" here include the lower/upper limits mentioned. The height of the 3-dimensional structure here refers to the difference between the highest and the lowest point of the structure, which with respect to the component cross section corresponds to the difference between the minimum and the maximum wall thickness. The surface of the 3-dimensionally structured surface preferably has a plurality of mutually distinguishable faces. More preferably there are at least 2, even more preferably >10 faces, particularly preferably >50 faces.

The structure is preferably introduced into the surface by means of injection-compression molding or is already introduced in the injection molding step.

A metal layer is applied to the side of the transparent thermoplastic layer that is opposite the visible side, that is to say the side having the 3-dimensionally structured surface. The metal layer in terms of its three-dimensional form typically follows the 3-dimensionally structured surface of the transparent thermoplastic layer. The metal layer is preferably applied by sputtering technology or via overmolded metallic foils, transfer films with metallic coating, or metallic spray coating systems.

The metal layer preferably contains at least one of the following metals or metalloids: Y, Ti, Zr, V, Nb, Ta, Cr, Mo, W, Mn, Fe, Co, Pd, Pt, Cu, Ag, Au, Zn, B, Al, In, TI, Si, Ge, Sn, Pb, Sb, Bi. It goes without saying that the metal layer can also comprise an alloy or a mixed layer of these elements. The metal layer preferably consists of one of these metals/metalloids/transition metals and/or an alloy and/or mixed layer of these elements. It goes without saying that the metal layer can also contain usual impurities. The metal layer is a single layer or a layer sequence of two or more different metal layers.

In the simplest case, the metal layer has a fully reflective configuration analogously to a mirror layer. As well as the relevant vacuum methods for application of the metal layers, especially sputtering methods, other conceivable methods are those of galvanization and wet-chemical deposition.

The methods are described in detail, for example, in "Vakuumbeschichtung Bd.1 bis 5" [Vacuum Coating Vol. 1 to 5], H. Frey, VDI-Verlag Dusseldorf 1995 or in "Oberflächen-und Dünnschicht-Technologie" [Surface and Thin-Film Technology] Part 1, R. A. Haefer, Springer Verlag 1987.

In order to achieve better metal adhesion and in order to clean the substrate surface, the surface to be coated can be subjected to a plasma pretreatment. A plasma pretreatment can under some circumstances change the surface properties of polymers. These methods are described, for example, in Friedrich et al. in "Metallized plastics 5&6: Fundamental and applied aspects" and in H. Grunwald et al. "Surface and Coatings Technology, 111 (1999), 287-296".

The combined transmittance Ty of the metal layer together with the transparent layer is at least 3.0%, more preferably at least 7.5%, even more preferably at least 10%, particularly preferably at least 14%, determined in accordance with DIN ISO 13468-2:2006 (D65, 10°).

A protective layer is preferably applied to the metal layer on the side oriented towards the diffuser layer. The protective layer, which can be composed of one or more individual layers, means protective layers which protect the metal layer from external influences, that is to say protect from corrosion or else from other external influences. Such protective layers may be applied in a PECVD (plasma-enhanced chemical vapor deposition) process or plasma polymerization process. In this case, low-boiling precursors, especially siloxane-based precursors, are evaporated into a plasma and hence activated such that they can form a film. Typical substances here are hexamethyldisiloxane (HMDSO), tetramethyldisiloxane, decamethylcyclopentasiloxane, octamethylcyclotetrasiloxane and trimethoxymethylsilane, particular preference being given to hexamethyldisiloxane. Most preferably, the layer is a layer containing hexamethyldisiloxane (HMDSO).

The total thickness of the protective layer is not more than 100 nm, more preferably less than 100 nm and particularly preferably less than 50 nm, very particularly preferably less than 35 nm.

In one embodiment, the protective layer may be formed from an electrically conductive layer, for example from an indium tin oxide (ITO)-containing layer. Especially preferably, the layer contains more than 50% by weight of ITO. Further useful conductive layers are those of zinc sulfide, silver chloride, zinc selenide and cadmium telluride. In this particular embodiment, the layer thickness may be up to 5 µm.

Preferably at least 50% of the rear side of the transparent thermoplastic layer is covered with metal, more preferably at least 75%, very particularly preferably the entire rear side, that is to say the side facing away from the visible side.

The metal layer produces a metallic gloss, which is also identifiable on the visible side of the transparent thermoplastic layer, through said transparent thermoplastic layer. This arises through the visible reflection of daylight, the total reflection being at least 10%, determined in accordance with ASTM E 1331:2015. The surface of the metal layer may be either reflective or semi-glossy.

In one embodiment, the metal layer also provides color effects or colored plays of light by reflecting ambient light or incident white light in color. Such effects are preferably achieved by a colored, transparent thermoplastic layer. This can be the transparent thermoplastic layer already described or a layer joined thereto.

The nature and thickness of the metal layer, or in the case of two or more individual metal layers, of the sum of all metal layers, should be selected so that the metal layer has a visual transmittance Ty (D65, 10°) in accordance with DIN ISO 13468-2:2006 of ≥4%, preferably ≥8%, more preferably ≥10%, particularly preferably ≥15%, very particularly preferably ≥25%. This ensures that the information emitted by the light source not only makes it through the diffuser layer, but also through the metal layer and then through the transparent layer. Because of this transparency, the metal layer can be transilluminated across the emitted color spectrum of the light/image source.

The diffuser layer is arranged at a distance of ≤5 mm, preferably of <2 mm, from the metal layer. This also includes the possibility of the diffuser layer directly adjoining the metal layer. A greater distance of the diffuser layer, while possible in principle, is not favoured since otherwise there will be a loss of brightness, image sharpness and viewing angle.

The diffuser layer is a layer that scatters white light and which preferably scatters light in a wavelength range at least of from 450 to 670 nm, more preferably from 400 to 780 nm.

In principle, various types of diffuser layer can be used. These are surface diffusers, volumetric diffusers or holographic diffusers.

The diffuser layer can be a film or a coating.

The thickness of the actively scattering layer in the diffuser is preferably <2 mm, more preferably <1 mm, even more preferably <650 µm, particularly preferably ≤500 µm, very particularly preferably <100 µm.

The diffuser layer has at least a transmittance of >50%, preferably >75%, more preferably >80%, particularly preferably >85%, determined in accordance with DIN ISO 13468-2:2006.

In addition, the diffuser layer has a half-value angle of 10° to 50°, preferably of 15 to 30°, more preferably of 18 to 25°, measured in accordance with DIN 5036:1978 (based on the light intensity).

The diffuser layer can scatter isotropically or anisotropically. An anisotropically scattering diffuser layer is characterized in that the greater spread, measured at the half-value angle, lies in the horizontal parallax and the smaller spread lies in the vertical.

In principle, any diffuser layer is suitable as a diffuser layer in the structure according to the invention, provided it has a transmittance Ty of at least >50%, determined in accordance with DIN ISO 13468-2:2006 (D65, 10°) and a half-value angle of 10°≤x≤50°, determined in accordance with DIN 5036:1978 (based on the light intensity).

The area of the diffuser layer corresponds to the maximum image area of the lighting unit.

The multilayer body of the lighting unit, comprising the transparent thermoplastic layer with 3-dimensionally structured surface, the metal layer and the diffuser layer which has a direct or function-oriented connection to the multilayer body, can be equipped with further layers, in particular protective and/or connecting layers. The transparent thermoplastic layer, in particular based on aromatic polycarbonate, preferably has a protective layer, in particular a scratch-resistant coating, which is located on the visible side of the lighting unit. Alternatively to or more preferably than this protective layer, the diffuser layer has a protective layer on the side facing towards the light source.

Even more preferably, no further layers are present.

The light source is preferably an LED light source. In the context of the present invention, an "LED light source" is to be understood as meaning a light source emitting light having radiation characteristics in which more than 70% of the intensity emitted in the range from 200 nm to 3000 nm is in the visible range of the spectrum. In the context of the present invention, the visible range is defined as the wavelength range from 360 nm to 780 nm. It is especially preferable when less than 5% of the intensity is in the range <360 nm. When considering the range from 360 nm to 500 nm, the LED light in the context of the present invention has a peak wavelength in terms of its intensity—i.e. wavelength of maximum intensity—of 360 nm to 460 nm, more preferably of 400 nm to 460 nm, and particularly preferably of 430 nm to 460 nm, alternatively particularly preferably of 400 nm to 405 nm. To determine the peak wavelength a radiation-equivalent parameter, for example radiation flux, is measured with spectral resolution and plotted in a Cartesian coordinate system. On the y axis is plotted the radiation-equivalent parameter and on the x axis the wavelengths. The absolute maximum of this curve is the "peak wavelength" (definition according to DIN 5031-1 (1982)). The term "from . . . to" includes the specified threshold values. The "LED light" preferably has a narrow emission width with a full width at half maximum of not more than 60 nm, more preferably of not more than 45 nm, even more preferably of not more than 30 nm, with particular preference being given to monochromatic light. In this case, the full width at half maximum is the full width of an emission peak at half height of the intensity.

Such emission characteristics are achieved inter alia by the use of semiconductors or lasers as a light source. Nowadays, semiconductor technology is frequently used, for example in LEDs (light-emitting diodes), organic LEDs (OLEDs) and electroluminescent films.

The light source that conveys information is a projection unit. According to the invention, "can convey information" means for example that moving images can be emitted by the light source. A suitable projection unit is for example an LED microprojector, preferably a near-edge projector (short distance projector), especially one with an optical system adapted to the geometry of the component, or a flat display screen, for example such as one of the LCD or organic LED or micro-LED type. The flat display screen preferably does not have its own diffuser in front of its panel but instead uses the diffuser element of the multilayer body of the lighting unit.

The light source is not necessarily directly mechanically joined to the other elements of the lighting unit. It can also be merely functionally joined to the other elements to form a unit. However, a mechanically joined combination may likewise be concerned.

The field of view of the lighting unit according to the invention is preferably in the range from −90° to +90°, preferably −70° to +70°, in particular −60° to +60° (in each case horizontally). If the desire is to expand the field of view, this can be achieved by providing the transparent thermoplastic layer with a convex curvature on the visible side.

Lighting units according to the invention are preferably used in car-to-X communication in the active state and used as a passive design element in the switched-off state (light source switched off). Due to the rear, 3-dimensional surface structure and applied metallization, the component, which is preferably used in the automobile exterior region, has a very premium appearance. Possible applications are, for example, front panels, side panels, rear spoilers or tailgates. In the active state, that is to say with rear projection, firstly light and design effects can be generated which in unison with the 3-dimensional structure can give the component an even more premium and elegant appearance. This can be used, for example, as a welcome function. Secondly, the entire surface of the component can also be used as a display for car-to-X communication. This is particularly important for autonomous vehicles. If the lighting unit according to the invention is situated in the front module of a vehicle, it can for example be indicated to a pedestrian that they are permitted to cross at a crosswalk and that the vehicle is waiting. If the lighting unit according to the invention is situated in the rear region of a vehicle, road users travelling behind can be made aware at an early stage of dangerous situations such as, for example, traffic jams or construction sites. Other possible uses are status displays, such as for example the charging status in the case of electric vehicles or the number of free seats in the case of autonomous taxis. However, lighting units according to the invention can also be used as decorative and/or informative elements in building façades, signs or in building interiors.

The invention is elucidated below on the basis of an exemplary embodiment and with reference to FIG. 1.

FIG. 1 shows a lighting unit according to the invention having a multilayer body and a light source (600) which communicates information. The multilayer body comprises a transparent thermoplastic layer (300) having a visible side and a rear side opposite the visible side. A scratch-resistant coating (500) is applied to the visible side of the transparent thermoplastic layer (300).

A 3-dimensional structure is located on the rear side of the transparent thermoplastic layer (300). A metal layer (200), which follows the elevations and depressions of the three-dimensional structure, is applied directly to the rear side of the transparent thermoplastic layer (300). A diffuser layer (100) is arranged at a distance from the metal layer (200) with an air space (400) in between. Behind this is situated the light source (600), a projection element.

EXAMPLES

The examples described in table 1 were produced, measured and evaluated as follows:

For the tests, injection-molded sample plates with a rear three-dimensional surface structure and dimensions of 200 mm×150 mm×3 mm were produced from polycarbonate compositions. In order to obtain different transmittances, various mixing ratios of a clear transparent polycarbonate (Makrolon® AG2677/550396) and of a dark transparently colored polycarbonate (Makrolon AG2677/18F123MA03) from Covestro Deutschland AG, were set. The proportion of the dark-colored polycarbonate was between 5% and 75% by weight. Subsequently, aluminum layers having various transmittances Ty (1-25%) were applied to the sample plates under vacuum by means of a sputtering process. The transmittances were determined beforehand on reference samples (small glass plates) in accordance with DIN ISO 13468-2: 2006 (D65, 10°). This gave the appropriate duration for the sputtering process for the various transmittances. Finally, the transmittances of the injection-molded sample plates with and without metallization layer were measured in accordance with DIN ISO 13468-2:2006 (D65, 10°) and visually assessed (% values in the table). The samples without metallization serve only as a reference. A diffuser film (Makrofol® LM 309 from Covestro Deutschland AG having a thickness of 300 µm, a transmittance according to DIN ISO 13468-2:2006 (D65, 10°) of 86% and a half-value angle of 20° according to DIN 5036:1978 (based on the light intensity)) was applied directly to the rear of the metallized plates and these were illuminated from the rear side, that is to say from the side facing away from the thermoplastic transparent layer, by a projector with a luminous power of 2000 lumen. The front side of the sample plates was exposed to direct daylight. The luminous power and color brilliance of the image projected through the sample plates were then evaluated in particular. The visual evaluation was divided into good (++), adequate (+) and poor (−−). The plates rated as good and adequate correspond to the embodiment according to the invention. The information conveyed by the projector was recognizable to a good to satisfactory extent.

TABLE 1

| Proportion of the dark- colored polycarbonate in the overall composition | Metal layer | | | | |
| --- | --- | --- | --- | --- | --- |
| | not present | with 25% transmittance | with 15% transmittance | with 4% transmittance | with 1% transmittance |
| 5% by weight | 75.49 | 24.74 (++) | 14.24 (++) | 3.23 (+) | n/a (−) |
| 10% by weight | 64.98 | 20.38 (++) | 14.11 (++) | 2.58 (−) | 0.44 (−) |
| 20% by weight | 51.48 | 18.83 (++) | 7.74 (+) | 1.81 (−) | n/a (−) |
| 30% by weight | 43.51 | 15.00 (++) | 8.28 (+) | 1.41 (−) | n/a (−) |
| 40% by weight | 36.82 | 11.54 (++) | 6.61 (+) | 1.15 (−) | 0.26 (−) |
| 50% by weight | 30.73 | 11.19 (++) | 5.05 (+) | 1.42 (−) | n/a (−) |
| 75% by weight | 9.08 | 2.28 (−) | 1-82 (−) | 0.39 (−) | 0.06 (−) |

The invention claimed is:

1. A lighting unit, comprising the following elements in this sequence
   a transparent thermoplastic layer (300) having a visible side and a side facing away from the visible side, wherein
   the transparent layer (300) has a transmittance Ty of ≥10%, determined in accordance with DIN ISO 13468-2:2006 (D65, 10°), and
   has a 3-dimensionally structured surface on the side facing away from the visible side,
   a metal layer (200) directly on the transparent layer (300) on the side facing away from the visible side, wherein the metal layer (200) has a transmittance Ty of ≥4%, determined in accordance with DIN ISO 13468-2:2006 (D65, 10°),
   wherein the combined transmittance Ty of the metal layer (200) with the transparent layer (300), determined in accordance with DIN ISO 13468-2:2006 (D65, 10°), is at least 3.0%,
   a diffuser layer (100), which is at a distance of ≤5 mm from the metal layer and has a transmittance Ty of at least >50%, determined in accordance with DIN ISO 13468-2:2006 (D65, 10°), and a half-value angle of 10°≤x≤50°, determined in accordance with DIN 5036:1978 (based on light intensity),
   a light source (600), which conveys information and is at a distance from the diffuser layer of <80 cm.

2. The lighting unit as claimed in claim 1, wherein the metal layer (200) is vapor-deposited or applied to the transparent layer (300).

3. The lighting unit as claimed in claim 1, wherein the diffuser layer (100) is arranged directly on the metal layer (200).

4. The lighting unit as claimed in claim 1, wherein the diffuser layer (100) lies against the-rear side of the metal layer (200).

5. The lighting unit as claimed in claim 1, wherein the light source (600) is a projector.

6. The lighting unit as claimed in claim 1, wherein the transmittance of the diffuser layer (100) is >80%, determined in accordance with DIN ISO 13468-2:2006.

7. The lighting unit as claimed in claim 1, wherein the 3-dimensionally structured surface has structural elements having a lateral extent of at least 1 mm, wherein surface normals of these structural elements have an angular deviation of >0.5°, based on surface normals of the adjoining structural elements, and wherein the height of these structural elements is in the range from 0.1 to 4 mm.

8. The lighting unit as claimed in claim 7, wherein the surface of the 3-dimensionally structured surface of the transparent thermoplastic layer (300) has more than 10 mutually distinguishable faces.

9. The lighting unit as claimed in claim 1, wherein the transparent thermoplastic layer (300) is based on aromatic polycarbonate.

10. The lighting unit as claimed in claim 1, wherein the transparent thermoplastic layer (300) on the visible side of the lighting unit has a maximum roughness of <0.1 μm, determined in accordance with DIN EN ISO 1302:2002-06.

11. The lighting unit as claimed in claim 1, wherein the diffuser layer (100) is applied directly to the metal layer (200).

12. The lighting unit as claimed in claim 1, wherein the transparent thermoplastic layer (300) has a neutral-gray color.

13. A component from the automobile exterior region, comprising the lighting unit as claimed in claim 1.

14. The component as claimed in claim 13, wherein the component is selected from the group consisting of a front panel, a side panel, a rear spoiler, a tailgate, and a subregion of these elements.

15. The component as claimed in claim 13, which is designed for car-to-X communication.

* * * * *